H. A. TUTTLE.
CLUTCH MECHANISM.
APPLICATION FILED FEB. 21, 1916.
1,266,178.
Patented May 14, 1918.
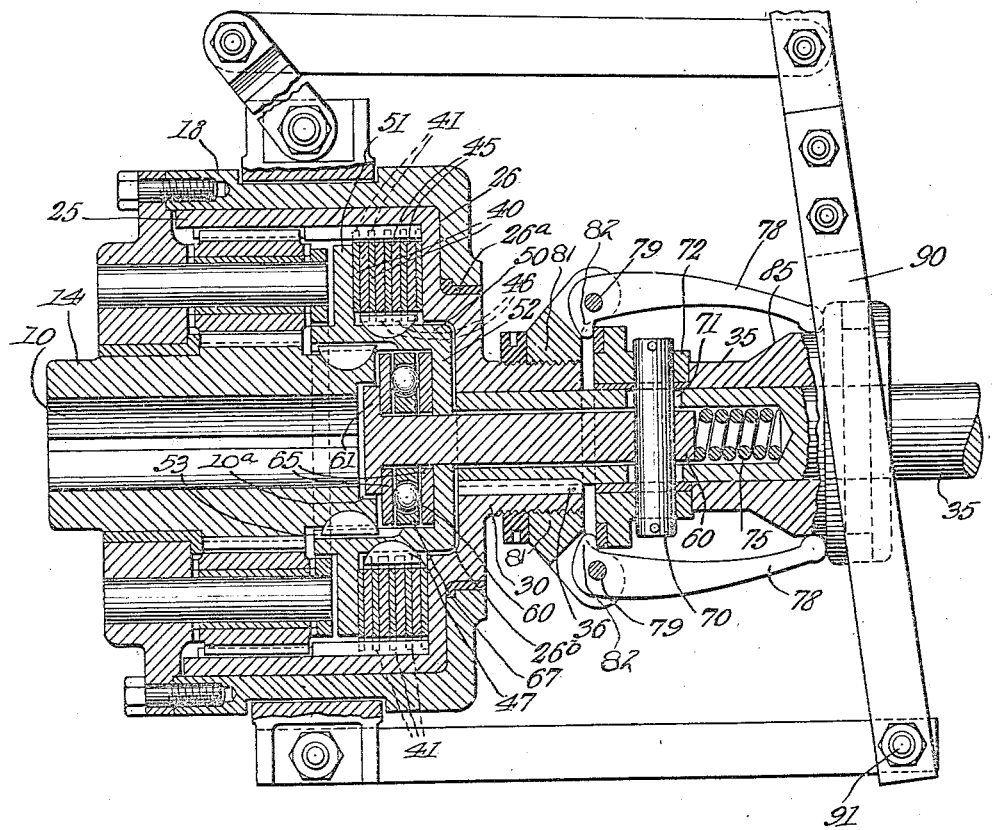
Inventor
Henry A. Tuttle
by Noyes and Hammond
Attys

UNITED STATES PATENT OFFICE.

HENRY A. TUTTLE, OF TAUNTON, MASSACHUSETTS.

CLUTCH MECHANISM.

1,266,178.

Specification of Letters Patent.

Patented May 14, 1918.

Original application filed September 30, 1912, Serial No. 723,001. Divided and this application filed February 21, 1916. Serial No. 79,546.

*To all whom it may concern:*

Be it known that I, HENRY A. TUTTLE, a citizen of the United States, residing at Taunton, in the county of Bristol and State of Massachusetts, have invented an Improvement in Clutch Mechanism, of which the following is a specification.

This application is a division of my application #723,001, filed Sept. 30, 1912. The invention relates to clutch mechanism for connecting a continuously-rotating shaft, herein termed a driving shaft, with another shaft, herein termed the driven shaft, and is especially advantageous for use in connection with reversing gear mechanisms, it being capable of association with the reversing gearing of such mechanisms, yet adapted for operation independently thereof.

The clutch is of the type involving a set of clutch disks or plates, and said disks, and operating-member therefor, serve to connect the two shafts together. The clutch plates are arranged between an engaging wall, fixed to the driven shaft, and an engaging wall arranged on an axially movable operating member, which is slidably connected with the driving shaft, and upon axial movement of said operating member, the two shafts will be connected. The engaging wall which is fixed to the driven shaft may be the crown of an internally toothed member, and alternate clutch plates are in slidable engagement with the teeth thereof. The operating member may be arranged within the internally toothed member and have an externally toothed hub to slidably receive alternate clutch plates. The said operating member is adapted to be moved by axially movable means extending through it and through the fixed member and arranged to be supported by the driven shaft, and movement of said member in a direction toward the engaging wall of the internally toothed member is employed to cause engagement of the clutch plates. Said operating member is itself slidably connected with the driven shaft, yet is rotatable therewith, and is also rotatable independently of the means for moving it axially, so that when in engaging position, it will revolve with the driven shaft.

The figure is a longitudinal vertical section of a clutch mechanism embodying this invention.

10 represents the driving-shaft, and 35 the driven-shaft, said shafts being arranged in alinement. A sleeve or hub 14 is fixed to the driving-shaft by a key or other means, and said sleeve has arranged on its circumference a plurality of spaced apart Woodruff projections, or other forms of projections whereby another toothed element, here shown as the clutch operating-member, may be slidably engaged therewith yet adapted for rotation. In lieu of the sleeve 14 with external projections, said projections may be formed externally about the circumference of the driving-shaft. The sleeve, or it may be the shaft, has a circular recess $10^a$ formed in its end.

An internally toothed member is fixed to the end of said shaft 35, adjacent the end of the driving-shaft 10. Said member comprises an internally toothed cylindrical wall 25, arranged in parallel relation with the shaft 35, and an engaging wall 26 arranged at right angles to and extended inward from said cylindrical wall, and a central outstanding portion arranged with an external shoulder $26^a$, and an internal recess $26^b$, said outstanding portion being centrally extended to form a hub 30 which is arranged on and fixed to the driven-shaft 35, by a key 36, or other means.

The teeth on the toothed wall 25 are arranged longitudinally, preferably in two sets, one in front of the other, the teeth being in alinement or one in continuation of another, and as a result the interdental spaces are correspondingly arranged and located so that the plates may be slid along the interdental spaces from the extremity to the inner end of the hub or body, but my invention is not limited to this particular structural arrangement of teeth.

The clutch operating-member comprises a cylindrical hub or body 50 having a closed end wall 52, and also having an engaging wall 51 extended outwardly from it. Said member is adapted to be arranged on and to be supported essentially by the sleeve 14 on the driving-shaft. Its hub is formed with internal teeth arranged longitudinally which enter the spaces between the projections 53 on the sleeve 14, thereby slidably connecting it with the driving-shaft, but adapting it for rotation therewith. Its engaging wall 51 is arranged near the inner end of the hub, so that when the hub is arranged on the sleeve a wide space is provided between the engaging wall 51 and the engaging wall 26 of the internally toothed member, in which is contained a set of clutch disks or plates. Its hub is also provided with external teeth or projections 47, arranged longitudinally, which are disposed in the clutch-plate chamber opposite the teeth on the internally toothed member. The closed end-portion of the hub extends into the circular recess $26^b$ of the internally toothed member and may have a bearing at such point or may loosely fit the recess.

In the clutch-plate chamber between the two engaging walls 51 and 26, a plurality of annular clutch-plates or disks 40 and 45 are arranged. Some of said plates, as 40, have their outer edges formed with projections 41, which enter the interdental spaces between the teeth of the internally toothed wall 25, and others, as 45, have projections 46 on their inner edges to enter the interdental spaces between the external projections 47 on the cylindrical hub 50.

The clutch plates are formed with flat frictional engaging faces and are alternately disposed for engagement with each other, thereby constituting a clutch of the friction type. Said plates are movable axially into engagement by an axial movement of the operating-member in one direction, and out of engagement when said operating-member is moved in the other direction.

The means to move said operating-member axially, as here shown, consists of a longitudinally movable stem 60, arranged in a center-hole in the driven-shaft and extended through a center hole in the end wall 52 of the hub 50 of the operating-member, and said stem has an enlarged end-portion or head 61, at the inside of said wall 52, which is separated from said end wall by a suitable thrust-bearing, and which is arranged in the circular recess $10^a$. The thrust-bearing here shown comprises a pair of circular plates 65, 65, with balls 66, arranged between them and held in position by a separating plate or ring 67. Longitudinal or axial movement of the stem 60 in a direction toward the right operates to move the operating-member in a corresponding direction, thereby to move axially the friction-plates and cause them to engage each other and the end wall 26 of the internally toothed member, thus connecting the two shafts together for forward drive. Movement of said stem in the opposite direction releases said parts permitting movement thereof in the opposite direction to cause the clutch-members to disengage and thereby disconnect the shafts.

To move the stem 60 longitudinally, as here shown, a pin 70 is extended through it transversely, the ends of which extend through slots 71 in the driven-shaft 35, and enter holes in a collar 72, which is slidably mounted on the driven-shaft or otherwise connected therewith, so that axial movement of said collar acts to correspondingly move the stem. Said collar is moved in a direction toward the left by a spring 75, arranged in the center-hole in the driven-shaft and bearing at one end against the stem, and is moved in the other direction by levers 78, pivoted at 79, to ears 80, on a collar 81, adjustably mounted on the hub of the internal gear, said levers having projections 82, which engage a friction ring arranged on the face of the collar 72. Said levers are arranged for engagement with a thrust-collar 85, having a conical portion, and said thrust-collar is engaged by an actuating lever 90, pivoted at 91. Movement of said actuating-lever 90, to the left of a perpendicular, operates to correspondingly slide the thrust-collar to in turn move the levers, thereby to slide the collar 72 in a direction toward the right, and correspondingly move the stem 60 and clutch operating-member connected therewith, thus to connect the shafts; and movement of said lever 90 to the right of a perpendicular permits operation of clutch-member to disconnect the shafts.

A case 18 is or may be provided which incloses several of the component parts, it being of cylindrical formation, and having two end walls one of which has a bearing upon the shoulder $26^a$ of the internally toothed member, and the other of which has a bearing upon the sleeve 14.

I claim:—

1. A clutch for connecting a driving-shaft with a driven-shaft comprising a member fixed to the driven-shaft having an engaging wall, a set of clutch-plates, one end of the set being arranged adjacent said wall, an axially movable member slidably connected to the driving-shaft having an engaging wall arranged adjacent the other end of said set of clutch-plates, some of said plates being slidably connected with said fixed member, and others slidably connected with said axially movable member, an axially movable headed stem extended centrally through said movable member and said fixed member, to move said axially movable member, and means arranged to engage said stem and move it axially.

2. A clutch mechanism for connecting a driving-shaft and a driven-shaft comprising an internally-toothed member fixed to the driven-shaft having an engaging wall, a set of clutch-plates, one end of the set being arranged adjacent said wall, an axially movable member slidably connected with the driving-shaft having an engaging wall arranged adjacent the outer end of said set of clutch-plates and having an externally-toothed hub, some of said plates slidably engaging the internally toothed member, and others slidably engaging the toothed hub, and means extended through said members arranged to move said movable member axially.

3. A clutch mechanism for connecting a driving-shaft and driven-shaft comprising a member having an engaging wall and extended into a sleeve fixed to the driven-shaft, a set of clutch-plates, one end of the set being arranged adjacent said wall, an axially movable member slidably connected to the driving-shaft having an engaging wall adjacent the other end of said set of clutch plates, some of said plates being slidably connected with said fixed member, and others slidably connected with said axially movable member and an axially movable headed stem extended centrally through said movable member and into a center hole in the sleeve-incased portion of the driven-shaft to move said axially movable member, and means to move said headed stem axially.

4. A clutch for connecting a driving-shaft with a driven-shaft, comprising a member fixed to the driven-shaft having an engaging wall, a set of clutch-plates, one end of the set being arranged adjacent said wall, an axially movable member slidably connected to the driving-shaft having an engaging wall arranged adjacent the other end of said set of clutch-plates, some of said plates being slidably connected with said fixed member, and others slidably connected with said axially movable member, an axially movable element extended through both members and connected with the driven-shaft to move said axially movable member, and means arranged on said driven-shaft to move said axially movable element.

5. A clutch for connecting a driving-shaft with a driven-shaft, comprising a member fixed to the driven-shaft having an engaging wall, a set of clutch-plates, one end of the set being arranged adjacent said wall, an axially movable member slidably connected to the driving-shaft having an engaging wall arranged adjacent the other end of said set of clutch-plates, some of said plates being slidably connected with said fixed member, and others slidably connected with said axially movable member, and an axially movable element for moving said axially movable member which is extended through said fixed and movable members and has its end-portions extended into said driving and driven-shafts.

6. A clutch mechanism for connecting a driving-shaft and a driven-shaft comprising an internally-toothed member fixed to the driven-shaft having an engaging wall, and a circular recess surrounded by said wall, a set of clutch-plates, one end of said set being arranged adjacent said wall, and an axially movable member slidably connected with the driven-shaft having an engaging wall arranged adjacent the other end of the set of clutch-plates and having an externally toothed hub extended into the recess in the aforesaid member, some of said clutch-plates being slidably connected with the externally toothed member and others slidably connected with the toothed hub, and means extended through said members arranged to move said movable member axially.

7. A clutch mechanism for connecting a driving-shaft and a driven-shaft comprising a driving-shaft having external longitudinal projections, a member fixed to the driven-shaft having an engaging wall, a set of clutch-plates, one end of the set being arranged adjacent said wall, an axially movable member having internal teeth for engagement with the externally toothed portion of the driving-shaft permitting axial movement thereof and having an engaging wall arranged adjacent the other end of said set of clutch-plates, some of said plates being slidably connected with said fixed member and others slidably connected with said axially movable member, and means to move said movable member axially.

8. A clutch mechanism for connecting a driving-shaft and a driven-shaft comprising a driving-shaft having external longitudinal projections, an internally toothed member fixed to the driven-shaft having an engaging wall, a set of clutch-plates, one end of the set being arranged adjacent said wall, an axially movable member having a hub arranged for engagement with the external projections on the driving-shaft permitting sliding engagement thereof, and having an engaging wall arranged adjacent the other end of said set of clutch-plates and having external teeth on its hub, some of said plates slidably engaging the internally toothed member, and others slidably engaging the external teeth on the hub, and means extended through said members arranged to move said movable member axially.

9. A clutch mechanism for connecting a driving-shaft with a driven-shaft comprising a driving-shaft having a recess in its end, a member fixed to the driven-shaft having an engaging wall, a set of clutch-plates, one end of the set being arranged adjacent said wall, an axially movable member slidably connected to the driving-shaft having an engaging wall arranged adjacent the other end of said set of clutch-plates, some of said plates being slidably connected with said fixed member, and others slidably connected with said axially movable member, and an axially movable headed stem extended into the driven-shaft and having its head arranged in the recess in the driving-shaft and adapted to move said movable member axially, and means arranged on the driven-shaft to move said stem axially.

10. A cluch for connecting a driving-shaft with a driven-shaft, comprising a member fixed to the driven-shaft having an engaging wall, a set of clutch-plates, one end of the set being arranged adjacent said wall, an axially movable member slidably connected to the driving-shaft having an engaging wall arranged adjacent the other end of said set of clutch-plates, some of said plates being slidably connected with said fixed member, and others slidably connected with said axially movable member, and an axially movable headed stem arranged to move said movable element and a ball-bearing thrust element interposed between the head of said stem and said movable member.

In testimony whereof, I have signed my name to this specification in the presence of two subscribing witnesses.

HENRY A. TUTTLE.

Witnesses:
B. J. NOYES,
H. B. DAVIS.